Aug. 25, 1970 L. HIDASSY 3,525,128

BUNDLING STRAP

Filed Nov. 20, 1968

INVENTOR
LASZLO HIDASSY
BY *David Teserline*
ATTORNEY

United States Patent Office 3,525,128
Patented Aug. 25, 1970

3,525,128
BUNDLING STRAP
Laszlo Hidassy, c/o Thomas & Betts Corporation,
36 Butler St, Elizabeth, N.J. 07207
Filed Nov. 20, 1968, Ser. No. 777,386
Int. Cl. B65d 63/00
U.S. Cl. 24—73    13 Claims

ABSTRACT OF THE DISCLOSURE

The disclosure is directed to an initially integral device for retaining upon a mounting member at least one article and employing an aperture within said mounting member. The device consists of an elongated strap body portion having at a first end thereof a boss proportioned to fit within an aperture in a mounting member to provide a grommet for said aperture. Within said boss is a transverse aperture extending therethrough to permit the passage of the strap body portion therethrough. Mounted adjacent, and extending within the transverse aperture, is a nib which will provide some restraint upon the strap body portion as it is drawn through the transverse aperture to prevent disassembly during installation. At the opposite end of the strap body portion, and readily severable therefrom, is a locking head portion which is removed from the strap prior to use. The head end portion consists of a boss portion for placement within the aperture of the mounting member from the side opposite the boss first mentioned. A transverse aperture extends through the head end portion for receipt of the strap therethrough. A locking member is placed within the transverse aperture in such a manner as to permit the strap body portion to be drawn through the aperture within the head end portion but prevents withdrawal of the strap therefrom. The bosses may be formed in such a manner to be acceptable in a plurality of different sized mounting member apertures or may be provided in hexagonal shapes or with splines thereon to prevent rotation of the strap with respect to the mounting member.

BACKGROUND OF THE INVENTION

Field of the invention

The invention is directed to the field of retaining articles to a mounting member. These articles may be electrical conductors, hose, tubing, pipe or the like. These mounting members may be walls, bulkheads, ceilings or other similar types of structural members.

Description of the prior art

In prior art devices metallic clamps, or metallic clamps having rubber, or similar types of protective sleeves were wrapped about an article to be mounted upon a mounting surface. The clamp further comprised a boss with an aperture extending thereto for receipt therein of a fastening device. An aperture was then placed within the mounting surface and a fastening device passed through the boss and into the mounting surface aperture and fastened by means of a nut, or similar device, on the opposite side of the mounting surface. Other types of clamps were plastic bundling straps, of the type shown in the U.S. Pat. No. 3,147,523 to M. C. Logan, issued Sept. 8, 1964, entitled "Cable Bundling and Supporting Strap" and assigned to the assignee of the instant invention. In such devices, a boss is provided with an aperture therethrough for receipt of a fastening device in order to fasten the strap once it had been wrapped about a plurality of conductors to be bundled. Further, separate fastening devices, such as screws, washers and nuts, were required. Separate grommets to protect the conductors from rough mounting member apertures were also required. It is not possible to place the bundling strap directly through the aperture within the mounting member because of the generally rough edges which resulted from the placement of the aperture within the mounting member. The plastic material of the bundling strap would be subjected to the cutting effects of a rough edge and within time would be destroyed.

SUMMARY OF THE INVENTION

The present invention overcomes the difficulties noted above with respect to prior art devices by providing a single, initially integral device which can be used for retaining an article and mounting said article upon a mounting surface. The device is formed of an elongated strap portion having a first boss at a first end thereof. Said first boss has an outer surface which can be fit within the aperture within the mounting member to provide a grommet therefore. An aperture extends through such first boss and adjacent said aperture is placed a nib which acts as a temporary restraining device to prevent unwanted separation of the strap body portion from the aperture within the first boss. At the second end of the strap body portion is a separable head member, having thereon a second boss which can be inserted into the mounting aperture from the opposite side to provide a grommet therefore. The head member contains a transverse aperture through which the body portion of the strap may be passed and a locking mechanism for retaining the strap body portion therein. The locking member is a selectively or unidirectional operating locking member whereby the strap may be drawn through the aperture and pass the locking member without interference during the time that the head member is tightened upon the strap body portion and which prevents removal from the strap body portion thereafter. The single strap member will serve both functions; that of retaining the article and permitting the article to be mounted upon a mounting surface and provides grommets at the entrance and exit of the mounting hole within the mounting surface to prevent destruction of the strap body portion thereby.

In order to prevent loss of the respective portions, the strap body portion and first boss portion are fabricated as a unitary member with the head member, which can be readily separated therefrom, prior to use and which provides, by such separation, a tapered tail end portion for easy insertion within the apertures of the first and second bosses.

Additionally, the boss portions may be fabricated in a generally truncated conical shape so as to be accommodated in mounting apertures in various diameters. Additionally, to provide a flush fit, a plurality of steps may be provided in the outer surface of the bosses so as to mate with apertures of varying diameters. Further, the bosses may be fabricated in hexagonal shapes, or other convenient shapes, or may be fabricated with a single spline to cooperate with similar shaped mounting apertures to prevent the device from rotating with respect to the mounting surface. It is therefore an object of this invention to provide an improved form of article bundling and supporting strap.

It is still another object of this invention to provide an improved form of article bundling and supporting strap wherein the locking member is fabricated initially as an integral portion of the overall device and which may be readily severed therefrom prior to use.

It is still another object of this invention to provide an improved article bundling and supporting strap which provides grommets to protect the strap at the input and output portions of an aperture within a mounting surface to protect the strap portions from such mounting aperture irregularities.

It is yet another object of this invention to provide an improved article bundling and supporting strap having back-up surfaces beyond the grommet portions to prevent the grommet from being drawn into, or through, the aperture of the mounting surface.

It is still another object of this invention to provide an improved article bundling and supporting strap whereby the boss of the first end thereof is provided with temporary restraining device to prevent unwanted separation of the strap from the boss contained aperture.

It is yet another object of this invention to provide an improved article bundling and supporting strap wherein the boss portions are shaped in order to prevent rotation of the article with respect to the mounting surface and to facilitate placement within different size mouning apertures in the mounting surface.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWING

In the drawings.

Similar elements will be given similar reference characters in each of the respective figures.

DESCRIPTION OF THE PREFERRED EMBODIMENT

Figure 1:
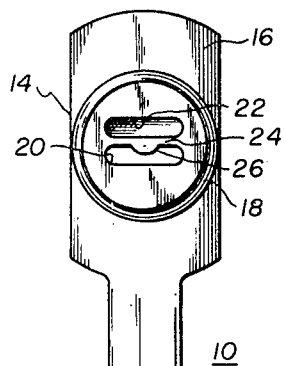
FIG. 1 is a front elevation of an article bundling strap constructed in accordance with the concepts of the invention.
Figure 2:
FIG. 2 is a side elevation of the article bundling strap of FIG. 1.
Figure 3:
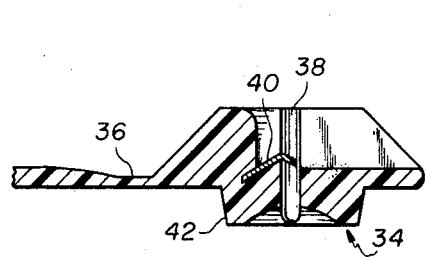
FIG. 3 is a sectional view of the head portion of the strap of FIG. 1 taken along the lines 3—3.

Turning now to FIGS. 1, 2 and 3 there is shown an article bundling and supporting strap 10 consrtucted in accordance with the concepts of the invention. Strap 10 has a body portion 12 terminating at a first retaining portion 14. First retaining portion 14 consists of a tab 16 and a boss 18. A transverse aperture 20 extends through the boss 18 and a tab 16. The transverse aperture 20 is of sufficient width, height and contour to permit the body portion 12 of the strap 10 to pass therethrough. A slot 22 extends in parallel with the transverse aperture 20 and provides a thin web 24 therebetween. Placed upon the web 24 is a nib 26 which partially blocks the transverse aperture 20. The nib 26 will bear against the surface of the body portion 12 of the strap 10 as the body portion 12 is passed through the transverse aperture 20, thereby selectively retaining the body portion 12 within the transverse aperture 20. The nib 26 will prevent unwanted separation, however, it can be easily overcome either to draw the strap body portion 12 further into the aperture 20 or to remove it therefrom. The boss 20 is in a generally conical shape such that it may be positioned within an aperture (not shown) placed within a mounting surface (not shown) to act as a grommet for the passage of the body portion 12 of strap 10, through the mounting aperture.

Figure 6:
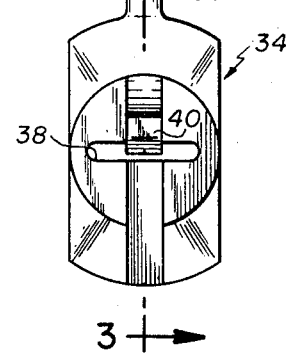
FIG. 6 is a front elevation of a first portion of the strap of FIG. 1 showing a second modification thereof.
Figure 7:
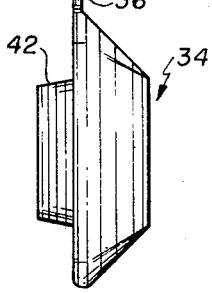
FIG. 7 is a side elevation of the head end portion of FIG. 2 showing certain modifications thereto.
Figure 5:
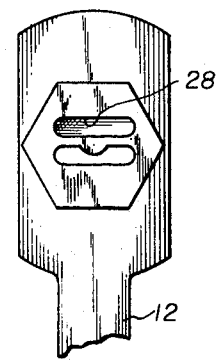
FIG. 5 is a front elevation of a first end portion of the strap of FIG. 1 showing a first modification thereto.
Figure 8:
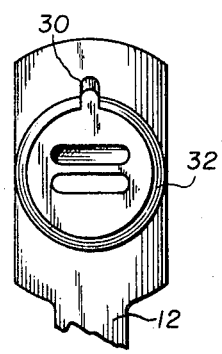
FIG. 8 is a side elevation of the head end portion of FIG. 2 showing additional modifications thereto.
Figure 8:
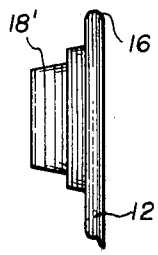
Figure 8:
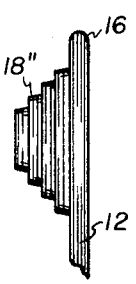

As can be seen in FIGS. 7 and 8, in addition to the smooth fusco-conical section as is shown in FIG. 2, the outer surface of the boss 18 may have a single step as is shown by boss 18' of FIG. 7, or may be multi-stepped as shown by boss 18" of FIG. 8. This permits the boss 18 to fit within mounting apertures of varying diameters. The tab portion 16 extends sufficiently beyond the boss 18 such as to rest in parallel with the outer surface of the mounting member and to prevent the first retaining portion 14 from being drawn through the mounting aperture. In addition to the stepping of the bosses 18, as is shown in FIGS. 7 and 8, it is possible to provide the boss in a hexagonal shape such as shown by the boss 28 of FIG. 5, or to provide the boss with a spline 30, as is shown with respect to the boss 32 of FIG. 6. In both of these instances the mounting aperture will be provided such as to accommodate the particular boss shape employed; for example, to employ the boss 28 of FIG. 5, the mounting aperture would also be provided with at least hexagonal entrance and exit configurations. In order to employ the splined boss of FIG. 6 it would be necessary to provide an additional slot to accommodate the spline 30 of the boss 32 of FIG. 6.

The second end of the strap 10 is provided with a separable head member 34 which is attached to the strap body portion 12 by means of a thin web 36. Web 36 may be simply broken by twisting or by pulling in order to separate the head member 34 from the strap body portion 12, prior to use. As can be seen from FIG. 2, the tail end portion of the strap body portion 12 adjacent the head member 34 is tapered such that when the head member 34 is separated from the body portion 12, a tapered tail end portion is provided which will facilitate the entrance of the strap body portion 12 within the various transverse apertures within the head member (to be described below) and the transverse aperture 20 within the first retaining portion 14.

A further transverse aperture 38 is provided in the head member 34, suitably shaped to permit the body portion 12 of the strap 10 to pass therethrough. Positioned within the transverse aperture 38 is a metallic tongue 40 arranged, as is better seen in FIG. 3, to permit one directional insertion of the strap body portion 12 through the aperture 38. The strap body portion 12, entering through the bottom portion of FIG. 3 into the aperture 38, will be permitted to deflect the metal tongue 40 in a counterclockwise direction allowing the further passage of the strap body portion 12 through the aperture 38. However, any attempt to withdraw the strap 10, that is by pulling it in a direction towards the bottom of FIG. 3, will cause the metallic tongue 40 to engage with the strap body portion 12 and to prevent its further withdrawal therefrom. Thus the tongue 40 will act as a one way locking mechanism. Head member 34 is provided with a boss 42 through which the transverse aperture 38 extends, as well, and which has an outer surface similar to that described with reference to the bosses 18, 18', 18", 28 or 32, as described with reference to FIGS. 1, 7, 8, 5 and 6 respectively. Boss 42 will also be fitted within the aperture of a mounting member as will be described below.

Figure 4:
FIG. 4 illustrates the application of the strap of FIG. 1 in mounting an article to a mounting surface.
Figure 4:
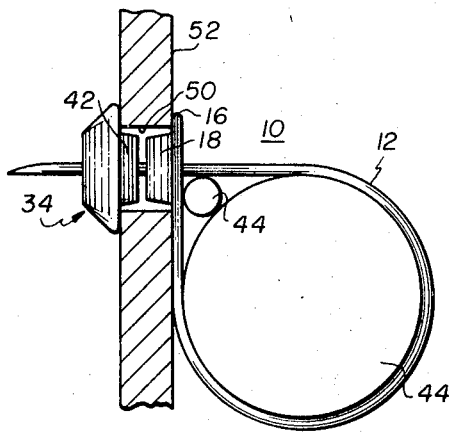

Turning now to FIG. 4, the manner of operation of the strap 10 is described. Prior to use, the head member 34 is separated from the body portion 12 as by twisting, pulling, or by use of cutting device or the like. Strap body portion 12 is then wrapped about an article, or articles, to be retained such as the articles 44. These articles may be a conductor, a plurality of conductors, hose, pipe, rod or the like. The tapered tail end portion exposed by the severance of the head member 34 from the body portion 12 is then inserted within the aperture 20 of the first retaining portion 14 and the strap body portion 12 is pulled up as tight as is necessary to retain the articles 44 within the looped portion of the strap body portion 12. The tail end portion is now placed within the aperture 50 of a mounting member 52 with the tab 16 in contact with a surface of mounting member 52 and boss 18 within the aperture 50 providing a grommet therefore. The head member 34 is now inserted over the exposed tail end portion of the body portion 12 in such a manner that the boss 42 enters the aperture 50 within the mounting member 52 providing a grommet for this side of the aperture 50. Head member 34 will then be pulled up tightly and locked to apply maximum tension to the strap body portion 12. The portion of the strap body, extending beyond the head end portion 34, may then be severed therefrom.

Thus as is seen in the arrangement of FIG. 4, the articles 44 are retained within a looped portion of the strap 10, and the strap 10 itself, by passing through two grommets, is employed to mount the articles 44 to a mounting surface 52 by employing an aperture 50 therethrough.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. An initially integral device for retaining upon a mounting member at least one article and employing an aperture in said mounting member comprising: an elongated strap body portion having opposite spaced first and seconds ends; a first boss at said first end; said first boss having a first transverse aperture therethrough proportioned to accept the trap body portion therein; said first boss being proportioned to fit within the aperture of said mounting member; a head member coupled to said second end of said strap body portion by suitable means so as to be readily severable therefrom for use therewith; said suitable connecting means forming when severed, a tapered free second end to facilitate use thereof; said head member having a second transverse aperture therethrough proportioned to accept the strap body portion therein; and means on said head member engaging said strap body portion yieldably on movement of said head member thereon and locking said head member with respect to said strap body portion whereby said strap body portion is looped about the article to be retained, passed through the aperture in said first boss positioned within said mounting member aperture, said mounting member aperture and said head member aperture to retain said article to said mounting member.

2. A device, as defined in claim 1, wherein said first boss is in the shape of a truncated cone whereby said first boss is receivable in mounting member apertures of different diameters.

3. A device, as defined in claim 2, wherein the surface of said truncated cone has at least one step.

4. A device, as defined in claim 1, wherein said first boss outer surface is hexagonal in shape.

5. A device, as defined in claim 1, wherein said first boss outer surface includes a spline to engage a cooperating keyway adjacent said mounting member aperture to prevent said device from rotating when positioned in said mounting member aperture.

6. A device, as defined in claim 1, further comprising a tab coupled to said strap body portion at said first end said first boss; a third transverse aperture through said tab communicating with said first aperture in said first boss, said third aperture proportioned to accept the strap body portion therethrough; said tab being positioned adjacent said mounting member when said first boss enters said mounting member aperture to prevent said first boss from being drawn through said mounting aperture.

7. A device, as defined in claim 1, wherein said first boss further comprises a slot adjacent said first aperture and defining a web therebetween; a nib on said web, said nib extending into and partially blocking said first aperture whereby the strap body portion is releasably held in said first aperture as it is passed therethrough.

8. A device, as defined in claim 1, further comprising a second boss coupled to said head member; a third transverse aperture therethrough proportioned to accept the strap body portion therein and communicating with said second aperture; said second boss proportioned to fit with said mounting member aperture.

9. A device, as defined in claim 8, wherein said second boss is of smaller dimension than said head member to provide a flat surface therebetween whereby said head member is prevented from being drawn through said mounting member aperture.

10. A device, as defined in claim 8, wherein said second boss is in the shape of a truncated cone whereby said second boss is receivable in mounting member aperture of different diameters.

11. A device, as defined in claim 10, wherein the surface of said truncated cone has at least one step.

12. A device, as defined in claim 8, wherein said second boss outer surface is hexagonal in shape.

13. A device, as defined in claim 8, wherein said second boss outer surface includes a spline to engage a cooperating keyway adjacent said mounting member aperture to prevent said device from rotating when positioned in said mounting member aperture.

References Cited

UNITED STATES PATENTS

| | | |
|---|---|---|
| 2,995,328 | 8/1961 | Whitted. |
| 3,302,913 | 2/1967 | Collyer et al. |
| 3,144,695 | 8/1964 | Budwig. |
| 3,416,198 | 12/1968 | Geisinger. |

DONALD A. GRIFFIN, Primary Examiner

U.S. Cl. X.R.

248—74

UNITED STATES PATENT OFFICE
CERTIFICATE OF CORRECTION

Patent No. 3,525,128     Dated August 25, 1970

Inventor(s) Laszlo Hidassy

It is certified that error appears in the above-identified patent and that said Letters Patent are hereby corrected as shown below:

Column 1, lines 3 and 4, delete "% Thomas & Betts Corporation, 36 Butler St., Elizabeth, N.J. 07207" and insert -- Elizabeth, Union County, N.J., assignor to Thomas & Betts Corporation, a corporation of New Jersey. --

"8" should be -- 18 --

Column 5, line 27, "seconds" should be -- second --

Column 5, line 29, "trap" should be -- strap --

Column 6, line 6, after "end" insert -- and --

SIGNED AND
SEALED
DEC 1 1970

(SEAL)
Attest:

Edward M. Fletcher, Jr.
Attesting Officer

WILLIAM E. SCHUYLER, JR.
Commissioner of Patents